(12) United States Patent
Joye et al.

(10) Patent No.: US 9,948,453 B2
(45) Date of Patent: Apr. 17, 2018

(54) THRESHOLD ENCRYPTION USING HOMOMORPHIC SIGNATURES

(71) Applicant: THOMSON LICENSING, Issy les Moulineaux (FR)

(72) Inventors: Marc Joye, Palo Alto, CA (US); Benoit Libert, Lyons (FR)

(73) Assignee: Thomson Licensing, Issy-les-Moulineaux (FR)

( * ) Notice: Subject to any disclaimer, the term of this patent is extended or adjusted under 35 U.S.C. 154(b) by 167 days.

(21) Appl. No.: 14/888,290

(22) PCT Filed: Apr. 29, 2014

(86) PCT No.: PCT/EP2014/058754
§ 371 (c)(1),
(2) Date: Oct. 30, 2015

(87) PCT Pub. No.: WO2014/177581
PCT Pub. Date: Nov. 6, 2014

(65) Prior Publication Data
US 2016/0072623 A1 Mar. 10, 2016

(30) Foreign Application Priority Data

Apr. 30, 2013 (EP) ..................... 13305573

(51) Int. Cl.
*H04L 9/00* (2006.01)
*H04L 9/30* (2006.01)
*H04L 9/32* (2006.01)
(52) U.S. Cl.
CPC ............ *H04L 9/008* (2013.01); *H04L 9/3073* (2013.01); *H04L 9/3247* (2013.01); *H04L 9/3255* (2013.01); *H04L 2209/24* (2013.01); *H04L 2209/72* (2013.01)

(58) Field of Classification Search
CPC ..... H04L 9/3073; H04L 9/008; H04L 9/3247; H04L 2209/24; H04L 2209/72
See application file for complete search history.

(56) References Cited

U.S. PATENT DOCUMENTS 7,743,253 B2 6/2010 Lauter et al.
8,130,947 B2 3/2012 Kerschbaum et al.
2008/0301448 A1* 12/2008 Charles ................. H04L 9/008
 713/176

FOREIGN PATENT DOCUMENTS

EP 1683298 B1 9/2008
WO WO2001020562 3/2001

OTHER PUBLICATIONS

Boneh et al, "Chosen Ciphertext Secure Public Key Threshold Encryption Without Random Oracles" The Cryptographers' Track at the RSA 2006, Feb. 2006, Lecture Notes in Computer Science, vol. 3860, pp. 226-243.*

(Continued)

*Primary Examiner* — Brandon Hoffman
*Assistant Examiner* — Nega Woldemariam
(74) *Attorney, Agent, or Firm* — Myers Wolin LLC

(57) ABSTRACT

A threshold encryption system comprising a sender device configured to generate ciphertexts and at least one entity device configured to perform partial decryption of ciphertexts. The system is based on Cramer-Shoup encryption systems and use linearly homomorphic signatures as publicly verifiable proofs of ciphertext validity.

8 Claims, 1 Drawing Sheet

(56) References Cited

OTHER PUBLICATIONS

Libert et al. "Non-Interactive CCA2-Secure Threshold Cryptosystems with Adaptive Security: New Framework and Constructions" In TCC2012, Mar. 19-21, 2012, Lecture Notes in Computer Science book series, vol. 7194, pp. 75-93, 2012.*
Boyd, C., "Digital Multisignatures", in Cryptography and Coding (H.J. Beker and F.C. Piper Eds.), Oxford University Press, New York, 1989, pp. 241-246.
Boyen et al., "Direct Chosen Ciphertext Security from Identity-Based Techniques", 12th ACM Conference on Computer and Communication Security, Alexandria, Virginia, USA, Nov. 7, 2005, pp. 320-329.
Junru etal "An efficient signcryption scheme with shortened ciphertext" 2010 International Conference on Computer Application and System Modeling Amer Inst Physics Conference Paper English; pp. V12/404-V12/407.
Fuchsbauer "Commuting signatures and verifiable encryption" Advances in Cryptology—EUROCRYPT 2011. Proceedings of the 30th Annual International Conference on the Theory and Applications of Cryptographic Techniques Springer-Verlag Berlin Conference Paper English;LNCS 6632, pp. 234-245.
Abe "Robust Distributed Multiplicaton with out Interaction" In Crypto'99, LNCS 1666, pp. 130-147, 1999.
Abe etal "Adaptively Secure Feldman VSS and Applications to Universally-Composable Threshold Cryptography" In Crypto'04, LNCS 3152, pp. 317-334, 2004.
Abe etal "Constant-Size Structure-Preserving Signatures: Generic Constructions and Simple Assumptions" In Asiacrypt'12, LNCS 7658, pp. 4-24, 2012.
Almansa etal "Simplified Threshold RSA with Adaptive and Proactive Security" In Eurocrypt'06, LNCS 4004, pp. 593-611, 2006.
Barreto etal "Pairing-Friendly Elliptic Curves of Prime Order" In SAC'05, LNCS 3897, pp. 319-331, 2005.
Boneh etal "Efficient Selective-ID Secure Identity-Based Encryption Without Random Oracles" In Eurocrypt'04, LNCS 3027, pp. 223-238, 2004.
Boneh etal "Chosen Cipher text Secure Public Key Threshold Encryption Without Random Oracles" In CT-RSA'06, LNCS 3860, pp. 226-243, 2006.
Boneh etal "Short group signatures" In Crypto'04, LNCS 3152, pp. 41-55, 2004.
Canetti etal "Adaptive Security for Threshold Cryptosystems" In Crypto'99, LNCS 1666, pp. 98-115, 1999.
Canetti etal "An Efficient Threshold Public Key Cryptosystem Secure Against Adaptive Chosen Ciphertext Attack" In Eurocrypt'99, LNCS 1592, pp. 90-106, 1999.
Cramer etal "A practical public key cryptosystem provably secure against adaptive chosen ciphertext attack" In Crypto'98, LNCS 1462, pp. 13-25, 1998.
Cramer etal "Universal Hash Proofs and a Paradigm for Adaptive Chosen Ciphertext Secure Public-Key Encryption" In Eurocrypt'02, LNCS 2332, pp. 45-64, 2002.
Canetti etal "Chosen-Ciphertext Security from Identity-Based Encryption" In Eurocrypt'04, LNCS 3027, pp. 207-222, 2004.
Cramer etal "Efficient Multi-Party Computations Secure Against an Adaptive Adversary" In Eurocrypt'99, LNCS 1592, pp. 311-326, 1999.
Cramer etal "Share Conversion, Pseudorandom Secret-Sharing and Applications to Secure Computation" In TCC'05, LNCS 3378, pp. 342-362, 2005.
Chaum etal "An Improved Protocol for Demonstrating Possession of Discrete Logarithms and Some Generalizations" In Eurocrypt'87, LNCS 304, pp. 127-141, 1987.
Daza etal "CCA2-Secure Threshold Broadcast Encryption with Shorter Ciphertexts" In ProvSec'07, LNCS 4784, Apr. 4, 2007; pp. 1-15.
Delerablee etal "Dynamic Threshold Public-Key Encryption" In Crypto'08, LNCS 5157, pp. 317-334, 2008.
Desmedt "Society and Group Oriented Cryptography: A New Concept" In Crypto'87, LNCS 293, pp. 120-127, 1987.
Desmedt etal "Threshold Cryptosystems" In Crypto'89, LNCS 435, pp. 307-315, 1989.
Dodis etal "Chosen-Ciphertext Security of Multiple Encryption" In TCC'05, LNCS 3378, pp. 188-209, 2005.
Fouque etal "Threshold Cryptosystems Secure against Chosen-Ciphertext Attacks" In Asiacrypt'01, LNCS 2248, pp. 351-368, 2001.
Frankel etal . "Adaptively-Secure Optimal-Resilience Proactive RSA" In Asiacrypt'99, LNCS 1716, pp. 180-194, 1999.
Groth "Simulation-sound NIZK proofs for a practical language and constant size group signatures" In Asiacrypt 2006, LNCS 4284, pp. 444-459, 2006.
Groth etal "Efficient non-interactive proof systems for bilinear groups" In Eurocrypt'08, LNCS 4965, pp. 415-432, 2008.
Jarecki etal "Adaptively Secure Threshold Cryptography: Introducing Concurrency, Removing Erasures" In Eurocrypt'00, LNCS 1807, pp. 221-242, 2000.
Kiltz etal "Chosen-ciphertext security from tag-based encryption" In TCC'06, LNCS 3876, pp. 581-600, 2006.
Krawczyk etal "Chameleon Signatures" In NDSS 2000; pp. 1-12.
Lewko etal "New Techniques for Dual System Encryption and Fully Secure HIBE with Short Ciphertexts" In TCC 2010, LNCS 5978, pp. 455-479, 2010.
Libert etal "Adaptively Secure Non-Interactive Threshold Cryptosystems" In ICALP 2011, LNCS 6756, pp. 588-600, 2011.
Libert etal "Non-Interactive CCA2-Secure Threshold Cryptosystems with Adaptive Security: New Framework and Constructions" In TCC 2012, LNCS 7194, pp. 75-93, Springer, 2012.
Lysyanskaya etal "Adaptive Security in the Threshold Setting: From Cryptosystems to Signature Schemes" In Asiacrypt'01, LNCS 2248, pp. 331-350, 2001.
Mackenzie "An Efficient Two-Party Public Key Cryptosystem Secure against Adaptive Chosen Ciphertext Attack" In PKC'03, LNCS 2567, pp. 47-61, 2003.
Naor etal "Public-key cryptosystems provably secure against chosen ciphertext attacks" In STOC'90, ACM Press, 1990; pp. 427-437.
Qin etal "Threshold Public-Key Encryption with Adaptive Security and Short Ciphertexts" In ICICS'10, LNCS 6476, pp. 62-76, 2010.
Rackoff etal "Non-Interactive Zero-Knowledge Proof of Knowledge and Chosen Ciphertext Attack" In Crypto'91, LNCS 576, pp. 433-444, 1992.
Scott "Authenticated ID-based Key Exchange and remote log-in with simple token and PIN number" Cryptology ePrint Archive: Report 2002/164; pp. 1-9.
Shoup etal "Securing Threshold Cryptosystems against Chosen Ciphertext Attack" In J. of Cryptology, 15(2), pp. 75-96, 2002. Earlier version in Eurocrypt'98, LNCS 1403, pp. 1-16, 1998.
Waters "Efficient Identity-Based Encryption Without Random Oracles" In Eurocrypt'05, LNCS 3494, 2005; pp. 114-127.
Waters "Dual System Encryption: Realizing Fully Secure IBE and HIBE under Simple Assumptions" In Crypto'09, LNCS 5677, pp. 619-636, 2009.
Wee "Threshold and Revocation Cryptosystems via Extractable Hash Proofs" In Eurocrypt'11, LNCS 6632, pp. 589-609, 2011.
Boneh etal : "Signing a Linear Subspace: Signature Schemes for Network Coding"; Mar. 18, 2009; Public Key Cryptography PKR 2009, Springer ; pp. 68-87.
Attraoadybg et al: "Efficient completely context-hiding quotable and linearly homomorphic signature"; Feb. 26, 2013 Public-key Cryptography PKC 2013; pp. 386-404.
Martin etal "Threshold MACs" Information Security and Cryptology—ICISC 2002. 5th International Conference. Revised Papers Conference Paper English; 2003; pp. 237-252.
Bellare etal "Random oracles are practical: A paradigm for designing efficient protocols" In ACM CCS, pp. 62-73, Nov. 1993.
Blazy et al "In Applied Cryptography and Network Security" (ACNS'10), LNCS 6123, pp. 218-235, 2010.

(56) References Cited

OTHER PUBLICATIONS

Frankel et al "Adaptively-Secure Distributed Public-Key Systems" In ESA'99, LNCS 1643, pp. 4-27, 1999.
Joye et al "Linearly Homomorphic Structure-Preserving Signatures" Patent application, Feb. 2013; pp. 1-31.

\* cited by examiner

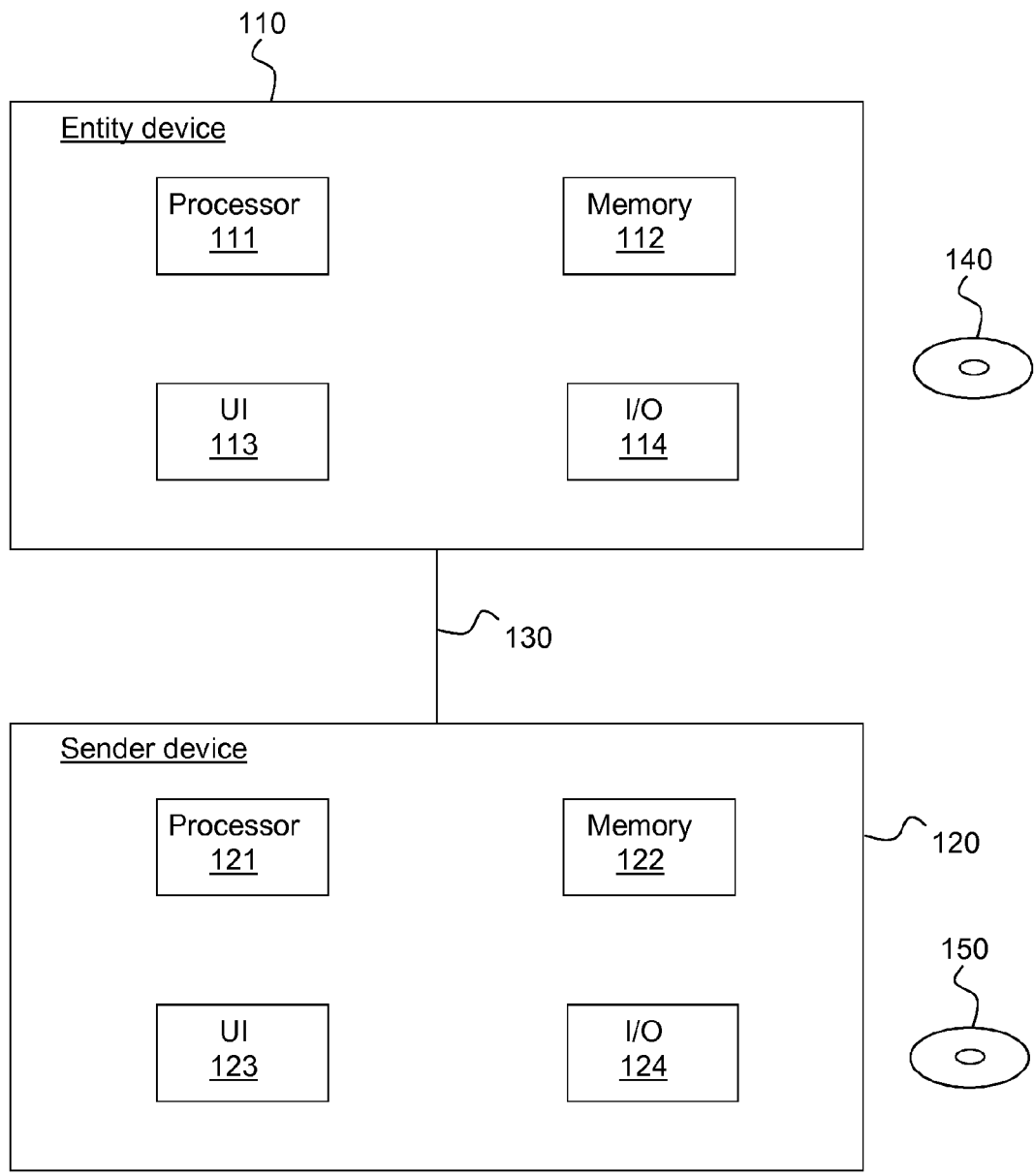

US 9,948,453 B2

THRESHOLD ENCRYPTION USING HOMOMORPHIC SIGNATURES

This application claims the benefit, under 35 U.S.C. § 365 of International Application PCT/EP2014/058754, filed Apr. 29, 2014, which was published in accordance with PCT Article 21(2) on Nov. 6, 2014 in English and which claims the benefit of European patent application No. 13305573.1, filed on Apr. 30, 2013.

TECHNICAL FIELD

The present invention relates generally to cryptography and in particular to threshold cryptosystems.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In threshold cryptosystems, private keys are shared among n entities (also called "servers") so as to avoid single points of failure. As a result, at least $t \leq n$ entities must contribute to the decryption process. When modeling the security, one distinguishes static adversaries, who have to decide which entities they want to corrupt before seeing the public key, from strictly stronger adaptive adversaries, who can decide whom to corrupt depending on the previously collected information.

More formally, a non-interactive (t,n)-threshold cryptosystem is a set of algorithms with these specifications.

Setup ($\lambda$, t, n): given a security parameter $\lambda$ and integers t, n$\in$poly($\lambda$) (with $1 \leq t \leq n$) denoting the number of decryption entities n and the decryption threshold t, this algorithm outputs (PK, VK, SK), where PK is the public key, SK=(SK$_1$, . . . , SK$_n$) is a vector of private-key shares and VK=(VK$_1$, . . . , VK$_n$) is a vector of verification keys. Decryption entity i is given the private key share (i, SK$_i$). For each i$\in$\{1, . . . , n\}, the verification key VK$_i$ will be used to check the validity of decryption shares generated using SK$_i$.

Encrypt (PK,M): is a randomized algorithm that, given a public key PK and a plaintext M, outputs a ciphertext C.

Ciphertext-Verify (PK,C): takes as input a public key PK and a ciphertext C. It outputs 1 if the ciphertext C is deemed valid with regard to the public key PK, and 0 otherwise.

Share-Decrypt (PK, i, SK$_i$, C): on input of a public key PK, a ciphertext C and a private-key share (i, SK$_i$), this (possibly randomized) algorithm outputs a special symbol (i,$\perp$) if Ciphertext-Verify (PK, C)=0. Otherwise, it outputs a decryption share $\mu_i$=(i,$\hat{\mu}_i$).

Share-Verify (PK, VK$_i$, C, $\mu_i$): takes in a public key PK, the verification key VK$_i$, a ciphertext C and a purported decryption share $\mu_i$=(i,$\hat{\mu}_i$). It outputs either 1 or 0. In the former case, $\mu_i$ is said to be a valid decryption share. In the following, the convention that (i,$\perp$) is an invalid decryption share is adopted.

Combine (PK, VK, C, $\{\mu_i\}_{i \in S}$): given a public key PK, the verification key VK, a ciphertext C and a subset S$\subset$\{1, . . . , n\} of size t=|S| with decryption shares $\{\mu_i\}_{i \in S}$, this algorithm outputs either a plaintext M or, if the set contains invalid decryption shares, $\perp$.

Further descriptions of threshold cryptosystems may be found in:

Y. Desmedt. Society and Group Oriented Cryptography: A New Concept. In *Crypto '87*, *Lecture Notes in Computer Science* 293, pp. 120-127, Springer, 1987.

Y. Desmedt, Y. Frankel. Threshold Cryptosystems. In *Crypto '89*, *Lecture Notes in Computer Science* 435, pp. 307-315, Springer, 1989.

C. Boyd. Digital Multisignatures. In *Cryptography and Coding* (H. J. Beker and F. C. Piper Eds.), Oxford University Press, pp. 241-246, 1989.

As will be described hereinafter, further developments have been made to threshold schemes.

Schemes Resisting Static Corruptions

Chosen-ciphertext security (Indistinguishability under Chosen Ciphertext Attack, IND-CCA) is widely recognized as the standard security notion for public-key encryption. Securely distributing the decryption procedure of CCA-secure public-key schemes has been a challenging task. The difficulty is that decryption entities should return their partial decryption results before knowing whether the incoming ciphertext is valid and, in some cases, partial decryptions of ill-formed ciphertexts may leak useful information to the adversary. For this reason, it is difficult to "thresholdize" the original Cramer-Shoup system [R. Cramer, V. Shoup. A practical public key cryptosystem provably secure against adaptive chosen ciphertext attack. In *Crypto '98*, *Lecture Notes in Computer Science* 1462, pp. 13-25, Springer, 1998.] because the validity of ciphertexts cannot be publicly verified.

The first solution to this problem was put forth by Shoup and Gennaro [V. Shoup, R. Gennaro. Securing Threshold Cryptosystems against Chosen Ciphertext Attack. In *Journal of Cryptology*, 15(2), pp. 75-96, 2002. Earlier version in *Eurocrypt '98*, *Lecture Notes in Computer Science* 1403, pp. 1-16, Springer, 1998.]: it requires the random oracle model and assumes static corruptions. In the standard model, Canetti and Goldwasser [R. Canetti, S. Goldwasser. An Efficient Threshold Public Key Cryptosystem Secure Against Adaptive Chosen Ciphertext Attack. In *Eurocrypt '99*, *Lecture Notes in Computer Science* 1592, pp. 90-106, 1999.] gave a threshold variant of the Cramer-Shoup encryption scheme. Unfortunately, their scheme requires interaction among decryption entities to obtain robustness (i.e., ensure that no coalition of t-1 malicious decryption entities can prevent uncorrupted servers from successfully decrypting) as well as to render invalid ciphertexts harmless. Cramer, Damgård and Ishai suggested [R. Cramer, I. Damgård, Y. Ishai. Share Conversion, Pseudorandom Secret-Sharing and Applications to Secure Computation. In *TCC '05*, *Lecture Notes in Computer Science* 3378, pp. 342-362, Springer, 2005.] a method to remove the need for interaction but it is only efficient for a small number of entities.

Other threshold variants of Cramer-Shoup were suggested [M. Abe. Robust Distributed Multiplicaton without Interaction. In *Crypto '99*, *Lecture Notes in Computer Science* 1666, pp. 130-147, Springer, 1999. and P. MacKenzie. An Efficient Two-Party Public Key Cryptosystem Secure against Adaptive Chosen Ciphertext Attack. In *PKC '03*, *Lecture Notes in Computer Science* 2567, pp. 47-61, Springer, 2003.] and Abe notably showed how to achieve optimal resilience (namely, guarantee robustness as long as the adversary corrupts a minority of t<n/2 entities) in the Canetti-Goldwasser system mentioned hereinbefore. In the last decade, generic constructions of CCA-secure threshold cryptosystems with static security were put forth [see Y. Dodis, J. Katz. Chosen-Ciphertext Security of Multiple Encryption. In *TCC'05*, *Lecture Notes in Computer Science* 3378, pp. 188-209, Springer, 2005.]

Using the techniques of Canetti-Halevi-Katz [see and R. Canetti, S. Halevi, J. Katz. Chosen-Ciphertext Security from Identity-Based Encryption. In *Eurocrypt'04*, *Lecture Notes in Computer Science* 3027, pp. 207-222, Springer, 2004.], Boneh, Boyen and Halevi [D. Boneh, X. Boyen, S. Halevi. Chosen Ciphertext Secure Public Key Threshold Encryption Without Random Oracles. In *CT-RSA'06*, *Lecture Notes in Computer Science* 3860, pp. 226-243, Springer, 2006.] gave a fully non-interactive robust CCA-secure threshold cryptosystem with a security proof in the standard model: in their scheme, decryption entities can generate their decryption shares without any communication with other entities. Similar applications of the Canetti-Halevi-Katz methodology to threshold cryptography were also studied [see X. Boyen, Q. Mei, B. Waters. Direct Chosen Ciphertext Security from Identity-Based Techniques. in *ACM CCS'05*, pp. 320-329, ACM Press, 2005. and E. Kiltz. Chosen-ciphertext security from tag-based encryption. In *TCC'06*, *Lecture Notes in Computer Science* 3876, pp. 581-600, Springer, 2006.].

Wee [H. Wee. Threshold and Revocation Cryptosystems via Extractable Hash Proofs. In *Eurocrypt '11*, *Lecture Notes in Computer Science* 6632, pp. 589-609, Springer, 2011.] defined a framework allowing to construct non-interactive threshold signatures and (chosen-ciphertext secure) threshold cryptosystems in a static corruption model.

Adaptively Secure Schemes

Most threshold systems (including the ones by Shoup-Gennaro, Canetti-Goldwasser, Dodis-Katz, Boneh-Boyen-Halevi, and [P.-A. Fouque, D. Pointcheval. Threshold Cryptosystems Secure against Chosen-Ciphertext Attacks. In *Asiacrypt'01*, *Lecture Notes in Computer Science* 2248, pp. 351-368, Springer, 2001.]) have been analyzed in a static corruption model, where the adversary chooses which entities it wants to corrupt before the scheme is set up. Unfortunately, adaptive adversaries—who can choose whom to corrupt at any time, as a function of their entire view of the protocol execution—are known (see, e.g., R. Cramer, I. Damgård, S. Dziembowski, M. Hirt, T. Rabin. Efficient Multi-Party Computations Secure Against an Adaptive Adversary. In *Eurocrypt'99*, *Lecture Notes in Computer Science* 1592, pp. 311-326, Springer, 1999.]) to be strictly stronger.

Assuming reliable erasures, Canetti et al. [R. Canetti, R. Gennaro, S. Jarecki, H. Krawczyk, T. Rabin. Adaptive Security for Threshold Cryptosystems. In *Crypto'99*, *Lecture Notes in Computer Science* 1666, pp. 98-115, Springer, 1999.] devised adaptively secure protocols for the distributed generation of discrete-logarithm-based keys and DSA signatures. Their techniques were re-used in threshold RSA signatures [see J. Almansa, I. Damgård, J.-B. Nielsen. Simplified Threshold RSA with Adaptive and Proactive Security. In *Eurocrypt'06*, *Lecture Notes in Computer Science* 4004, pp. 593-611, Springer, 2006.]. Frankel, MacKenzie and Yung independently showed different methods to achieve adaptive security in the erasure-enabled setting [see Y. Frankel, P. MacKenzie, M. Yung. Adaptively-Secure Distributed Public-Key Systems. In *ESA'99*, *Lecture Notes in Computer Science* 1643, pp. 4-27, Springer, 1999. and Y. Frankel, P. MacKenzie, M. Yung. Adaptively-Secure Optimal-Resilience Proactive RSA. In *Asiacrypt'99*, *Lecture Notes in Computer Science* 1716, pp. 180-194, Springer, 1999.].

Subsequently, Jarecki and Lysyanskaya [S. Jarecki, A. Lysyanskaya. Adaptively Secure Threshold Cryptography: Introducing Concurrency, Removing Erasures. In *Eurocrypt'00*, *Lecture Notes in Computer Science* 1807, pp. 221-242, Springer, 2000.] eliminated the need for erasures and gave an adaptively secure variant of the Canetti-Goldwasser threshold cryptosystem which appeals to interactive zero-knowledge proofs but remains secure in concurrent environments. Unfortunately, their scheme requires a fair amount of interaction among decryption entities. Lysyanskaya and Peikert [A. Lysyanskaya, C. Peikert. Adaptive Security in the Threshold Setting: From Cryptosystems to Signature Schemes. In *Asiacrypt'01*, *Lecture Notes in Computer Science* 2248, pp. 331-350, Springer, 2001.] also dealt with adaptive adversaries but their schemes are also interactive. Abe and Fehr [M. Abe, S. Fehr. Adaptively Secure Feldman VSS and Applications to Universally-Composable Threshold Cryptography. In *Crypto'04*, *Lecture Notes in Computer Science* 3152, pp. 317-334, Springer, 2004.] showed how to dispense with zero-knowledge proofs in the Jarecki-Lysyanskaya construction so as to prove it secure in (a variant of) the universal composability framework but without completely eliminating interaction from the decryption procedure.

In 2010, Qin et al. [B. Qin, Q. Wu, L. Zhang, J. Domingo-Ferrer. Threshold Public-Key Encryption with Adaptive Security and Short Ciphertexts. In *ICICS'10*, *Lecture Notes in Computer Science* 6476, pp. 62-76, Springer, 2010.] suggested a non-interactive threshold cryptosystem (more precisely, a threshold broadcast encryption scheme) with adaptive security. Its downside is its lack of scalability since private key shares consist of $O(n)$ elements, where n is the number of entities (while, in prior schemes, the share size only depends on the security parameter). Moreover, the security proof requires the threshold t to be at most poly-logarithmic in the security parameter, even if n is polynomial.

In 2011, Libert and Yung showed [B. Libert, M. Yung. Adaptively Secure Non-Interactive Threshold Cryptosystems. In *ICALP* 2011, *Lecture Notes in Computer Science* 6756, pp. 588-600, Springer, 2011.] an adaptively secure variant of the Boneh-Boyen-Halevi construction using groups of composite order. Their scheme is based on a very specific use of the Lewko-Waters techniques [A. Lewko, B. Waters. New Techniques for Dual System Encryption and Fully Secure HIBE with Short Ciphertexts. In *TCC* 2010, *Lecture Notes in Computer Science* 5978, pp. 455-479, Springer, 2010.], which limits its applicability to composite order groups and makes it computationally expensive (not to mention the difficulty of combining it with existing adaptively secure distributed key generation techniques). In 2012, Libert and Yung [B. Libert, M. Yung. Non-Interactive CCA2-Secure Threshold Cryptosystems with Adaptive Security: New Framework and Constructions. In *TCC* 2012, *Lecture Notes in Computer Science* 7194, pp. 75-93, Springer, 2012.] described a framework for constructing more efficient non-interactive adaptively secure CCA-secure threshold cryptosystems. However, their most efficient schemes remain significantly less efficient than the standard Cramer-Shoup cryptosystem—which incurs a ciphertext overhead of about 768 bits on carefully chosen elliptic curves for 128 bits of security—for a given security level. In their most efficient construction, ciphertexts are about 3328 bits longer than plaintexts at the 128-bit security level.

It will thus be appreciated that there is a need for a solution that improves the efficiency of the adaptively secure non-interactive constructions in the latter paper by Libert and Yung from bandwidth and computational points of view, while retaining security proofs in the standard model under hardness assumptions of constant size: namely, the number of input elements should not depend on the number of decryption queries made by the adversary. The present invention provides such a solution.

SUMMARY OF INVENTION

In a first aspect, the invention is directed to a device for encrypting a message using a public key. The device comprises a processor configured to: obtain encryption exponents; generate a plurality of ciphertext components, wherein a first ciphertext component is generated by multiplying the message with at least one element of the public key to the power of an encryption exponent and a plurality of second ciphertext components, each of the plurality of second ciphertext components being generated by taking at least one further element of the public key to the power of an encryption exponent; generate a linearly homomorphic signature on the plurality of second ciphertext components with respect to a tag obtained from the first ciphertext component and at least part of the plurality of second encryption components; and generate an overall ciphertext comprising the ciphertext components, and the linearly homomorphic signature. The device further comprises an interface configured to output the overall ciphertext.

In a second aspect, the invention is directed to a device for partially decrypting a ciphertext using a partial private key comprising a share of an entire private key, the ciphertext comprising a first ciphertext component, and a plurality of second ciphertext components forming a linearly homomorphic signature. The device comprises a processor configured to: verify that the linearly homomorphic signature is a valid signature for a vector comprising the plurality of second ciphertext components; obtain a partial decryption of the ciphertext using the partial private key; generate commitments to exponents of the partial private key; generate a proof that the commitments satisfy at least one predefined equality showing the correctness of the partial decryption; and generate a result comprising the partial decryption, the commitments and the proof. The device further comprises an interface configured to output the result.

In a third aspect, the invention is directed to a method for encrypting a message using a public key. A processor obtains encryption exponents; generates a plurality of ciphertext components, wherein a first ciphertext component is generated by multiplying the message with at least one element of the public key to the power of an encryption exponent and a plurality of second ciphertext components, each of the plurality of second ciphertext components being generated by taking at least one further element of the public key to the power of an encryption exponent; generates a linearly homomorphic signature on the plurality of second ciphertext components with respect to a tag obtained from the first ciphertext component and at least part of the plurality of second encryption components; generates an overall ciphertext comprising the ciphertext components, and the linearly homomorphic signature; and outputs the overall ciphertext.

In a fourth aspect, the invention is directed to a method for partially decrypting a ciphertext using a partial private key comprising a share of an entire private key, the ciphertext comprising a first ciphertext component, and a plurality of second ciphertext components forming a linearly homomorphic signature. A processor verifies that the linearly homomorphic signature is a valid signature for a vector comprising the plurality of second ciphertext components; obtains a partial decryption of the ciphertext using the partial private key; generates commitments to exponents of the partial private key; generates a proof that the commitments satisfy at least one predefined equality showing the correctness of the partial decryption; generates a result comprising the partial decryption, the commitments and the proof; and outputs the result.

In a fifth aspect, the invention is directed to a non-transitory digital data support that stores instructions that, when executed by a processor, perform the method of the third aspect.

In a sixth aspect, the invention is directed to a non-transitory digital data support that stores instructions that, when executed by a processor, perform the method of the fourth aspect.

BRIEF DESCRIPTION OF DRAWINGS

Preferred features of the present invention will now be described, by way of non-limiting example, with reference to the accompanying drawings, in which FIG. 1 illustrates an exemplary system in which the invention may be implemented.

DESCRIPTION OF EMBODIMENTS

A main idea of the present invention is to use linearly homomorphic signatures as publicly verifiable proofs of ciphertext validity in Cramer-Shoup-type encryption schemes. Such schemes rely on the fact that, for a given public key, a cryptosystem may have exponentially many possible private keys. The key idea is that, in the security proofs of Cramer-Shoup, the adversary does not know which private key the reduction is using. The only way for the adversary to infer information about the reduction's particular private key is to invoke the decryption oracle on invalid ciphertexts (because, on valid ciphertexts, all private keys give the same result).

For example, for a cyclic group $\mathbb{G}$ of order p, consider the semantically secure cryptosystem where ciphertexts in $\mathbb{G}^4$ $$(C_1, C_2, C_3, C_0) = (f^{\theta_1}, h^{\theta_2}, g^{\theta_1+\theta_2}, M \cdot X_1^{\theta_1} \cdot X_2^{\theta_2})$$

are decrypted as $M = C_0 \cdot C_1^{-x_1} \cdot C_2^{-x_2} \cdot C_3^{-y}$, where $(X_1, X_2) = (f^{x_1} g^y, h^{x_2} g^y)$ is the public key and $(x_1, x_2, y)$ is the private key. In Libert and Yung [B. Libert, M. Yung. Non-Interactive CCA2-Secure Threshold Cryptosystems with Adaptive Security: New Framework and Constructions. In TCC 2012, *Lecture Notes in Computer Science* 7194, pp. 75-93, Springer, 2012.] such a system was made chosen-ciphertext secure using a publicly verifiable proof that $(C_1, C_2, C_3)$ is of the form $(C_1, C_2, C_3) = (f^{\theta_1}, h^{\theta_2}, g^{\theta_1+\theta_2})$, for some $\theta_1, \theta_2 \in \mathbb{Z}_p$. In the security proof, the reduction is guaranteed not to leak too much information about $(x_1, x_2, y)$ as long as the adversary is unable to generate a fake proof for an invalid triple $(C_1, C_2, C_3)$. Consequently, if the challenge ciphertext is computed by choosing an invalid triple $(C_1, C_2, C_3)$ and computing $C_0 = M \cdot C_1^{x_1} \cdot C_2^{x_2} \cdot C_3^y$, the plaintext M is independent of the adversary's view. To make sure the adversary will not obtain the result of a decryption query on an invalid $(C_1, C_2, C_3)$, Libert-Yung includes in each ciphertext a non-interactive Groth-Sahai proof [see J. Groth and A. Sahai. Efficient non-interactive proof systems for bilinear groups. In *Eurocrypt '08*, *Lecture Notes in Computer Science* 4965, pages 415-432, Springer, 2008] that $(C_1, C_2, C_3)$ is well-formed in the ciphertext. This technique works well in the threshold setting because Groth-Sahai proofs are publicly verifiable.

In the present invention, efficiency is gained by replacing these Groth-Sahai proofs by linearly homomorphic signatures. The idea is to include in the public key the verification key of a one-time linearly homomorphic structure-preserving signature (SPS) for n=3 as well as signatures on the vectors $(f, \mathbb{G}, g), (\mathbb{G}, h, g) \in \mathbb{G}^3$. This allows the sender to publicly derive a linearly homomorphic signature $(z, r, u)$ on the vector $(C_1, C_2, C_3) = (f^{\theta_1}, h^{\theta_2}, g^{\theta_1+\theta_2})$. Each cipher text thus consists of $(z, r, u, C_0, C_1, C_2, C_3)$. In the security proof, at each pre-challenge decryption query, the signature $(z, r, u)$ serves as publicly verifiable evidence that $(f, h, g, C_1, C_2, C_3)$ has the right form: in order to generate a proof for a false statement, the adversary has to break the security of the homomorphic signature, by deriving a signature on a vector $(C_1, C_2, C_3)$ outside the span of $(f, \mathbb{G}, g)$ and $(\mathbb{G}, h, g)$.

While this technique suffices to achieve security against non-adaptive chosen-ciphertext attacks (where the adversary has a decryption oracle only before the challenge phase), it is no longer sufficient if the adversary is allowed to make post-challenge decryption queries: indeed, the scheme remains malleable. To address this problem, the first and second preferred embodiments of the present invention take advantage of the tag in the first signature of the linearly homomorphic signature scheme described in the Annex, while the third preferred embodiment uses the second signature scheme of the Annex.

When encrypting the message, the sender first derives a one-time linearly homomorphic signature on the vector $(C_1, C_2, C_3)$ and then computes a checksum value by hashing $(C_0, C_1, C_2, C_3)$ and certain linearly homomorphic signature components: the resulting checksum value $\tau$ is obtained by applying a chameleon hash [see H. Krawczyk, T. Rabin. Chameleon Signatures. In *Proceedings of the Network and Distributed System Security Symposium (NDSS* 2000), The Internet Society, 2000.] function to $(C_0, C_1, C_2, C_3)$ and $(z, r)$ components of the derived signature. The resulting value then serves as a tag in the linearly homomorphic signature (which the sender can construct from the derived one-time linearly homomorphic signature on $(C_1, C_2, C_3)$) and helps make sure that post-challenge decryption queries will not help the adversary.

Eventually, the efficiency of Libert-Yung is significantly improved for two reasons: (i) In the ciphertext, Groth-Sahai proofs can be replaced by linearly homomorphic signatures, which are more compact; (ii) The structure of the ciphertexts of the present invention makes it possible to use a chameleon hash function instead of a one-time signature (which was not possible in Libert-Yung) to hedge against post-challenge decryption queries: this allows eliminating at least 4 group elements from the ciphertext.

First Preferred Embodiment

The first preferred embodiment relies on the simultaneous eXternal Decision Linear assumption: i.e., it is assumed that $XDLIN_1$ and $XDLIN_2$ both hold in asymmetric pairing-friendly groups $(\mathbb{G}, \mathbb{G}, \mathbb{G}_T)$; the assumption is described in M. Abe, M. Chase, B. David, M. Kohlweiss, R. Nishimaki, M. Ohkubo. Constant-Size Structure-Preserving Signatures: Generic Constructions and Simple Assumptions. In *Asiacrypt '12, Lecture Notes in Computer Science* 7658, pp. 4-24, Springer, 2012.

Keygen $(\lambda, t, n)$:

1. Choose bilinear groups $(\mathbb{G}, \mathbb{G}, \mathbb{G}_T)$ of prime order $p > 2^\lambda$, generators $$g, f, h \xleftarrow{R} \mathbb{G}, \hat{g} \xleftarrow{R} \hat{\mathbb{G}}, x_1, x_2, y \xleftarrow{R} \mathbb{Z}_p$$

and set $X_1 = f^{x_1} g^6 \in \mathbb{G}$, $X_2 = h^{x_2} g^y \in \mathbb{G}$. Then, define the vectors $\vec{f} = (f, 1, g) \in \mathbb{G}^3$ and $\vec{h} = (1, h, g) \in \mathbb{G}^3$.

2. Choose $$\hat{f}_1, \hat{f}_2 \xleftarrow{R} \hat{\mathbb{G}}$$

and define vectors $$\vec{f}_1 = (\hat{f}_1, 1, \hat{g}), \vec{f}_2 = (1, \hat{f}_2, \hat{g}), \vec{f}_3 = \vec{f}_1^{\varphi_1} \cdot \vec{f}_2^{\varphi_2} \cdot (1, 1, \hat{g})$$

where $$\phi_1, \phi_2 \xleftarrow{R} \mathbb{Z}_p,$$

which is used as a Groth-Sahai Common reference string (CRS) to prove the validity of decryption shares so as to achieve robustness against malicious adversaries.

3. Choose random polynomials $P_1[Z], P_2[Z], P[Z] \in \mathbb{Z}_p[Z]$ of degree $t-1$ such that $P_1(0) = x_1$, $P_2(0) = x_2$ and $P(0) = y$. For each $i \in \{1, \ldots, n\}$, compute $$Y_{i,1} = f^{P_1(i)} g^{P(i)}, Y_{i,2} = h^{P_2(i)} g^{P(i)}.$$

4. Choose a chameleon hash function [see the paper by Krawczyk and Rabin] $CMH = (CMKg, CMhash, CMswitch)$ where the hashing algorithm CMhash ranges over $\{0,1\}^L$, with $L \in \text{poly}(\lambda)$. Then, generate a pair $$(hk, tk) \xleftarrow{\$} \mathcal{G}(\lambda)$$

made of a hashing key hk and its corresponding trapdoor tk. As the latter is not used in the scheme, it can be erased.

5. Generate a key pair for the linearly homomorphic signature with n=3. Let $$(g_z, g_r, h_z, h_u, \hat{g}_z, \hat{g}_r, \hat{h}_z, \hat{h}_u, \{g_i, h_i\}_{i=1}^3, \{\hat{g}_i, \hat{h}_i\}_{i=1}^3, w, \hat{w})$$

be the public key, where $w \in \mathbb{G}^{L+1}$ and $\hat{w} \in \hat{\mathbb{G}}^{L+1}$, and let $\{\chi_i, \gamma_i, \delta_i\}_{i=1}^3$ be the corresponding private key. The private key component $h_z^{\alpha_r}$ is not used and can be discarded.

6. Generate one-time linearly homomorphic signatures $\{(z_j, r_j, u_j)\}_{j=1,2}$ on the vectors $\vec{f} = (f, 1, g) \in \mathbb{G}^3$ and $\vec{h}(1, h, g) \in \mathbb{G}^3$. These are obtained as $$(z_1, r_1, u_1) = (f^{-\chi_1} g^{-\chi_3}, f^{-\gamma_1} g^{-\gamma_3}, f^{-\delta_1} g^{-\delta_3}) \text{ and}$$

$$(z_2, r_2, u_2) = (h^{-\chi_2} g^{-\chi_3}, h^{-\gamma_2} g^{-\gamma_3}, h^{-\delta_2} g^{-\delta_3}).$$

7. Define the vector of decryption key shares as $SK = (SK_1, \ldots, SK_n)$, where $SK_i = (P_1(i), P_2(i), P(i)) \in \mathbb{Z}_p^3$ for each $i \in \{1, \ldots, n\}$. The corresponding vector $VK = (VK_1, \ldots, VK_n)$ of verification keys is defined so that, for each $i \in \{1, \ldots, n\}$, $VK_i = (Y_{i,1}, Y_{i,2}) \in \mathbb{G}^2$. The public key PK is defined as $$(g, \hat{g}, \vec{f}, \vec{h}, \vec{f}_1, \vec{f}_2,$$
$$\vec{f}_3, X_1, X_2, g_z, g_r, h_z, h_u, \hat{g}_z, \hat{g}_r, \hat{h}_z, \hat{h}_u, \{g_i, h_i\}_{i=1}^3, \{\hat{g}_i, \hat{h}_i\}_{i=1}^3, w, \hat{w},$$
$$\{(z_j, r_j, u_j)\}_{j=1}^3, hk)$$

Encrypt (M, PK): to encrypt a message $M \in \mathbb{G}$:
1. Choose $$\theta_1, \theta_2 \xleftarrow{R} \mathbb{Z}_p$$

and compute $$C_0 = M \cdot X_1^{\theta_1} \cdot X_2^{\theta_2}, \ C_1 = f^{\theta_1}, \ C_2 = h^{\theta_2}, \ C_3 = g^{\theta_1 + \theta_2}.$$

2. Derive a homomorphic signature $(z, r, u, v)$ on the vector $(C_1, C_2, C_3) \in \mathbb{G}^3$ with respect to a tag $\tau$ that will authenticate the whole ciphertext. Namely, choose $$\rho \xleftarrow{R} \mathbb{Z}_p$$

as well as random coins $$s_{hash} \xleftarrow{R} \mathcal{R}_{hash}$$

for CMH and compute $$z = z_1^{\theta_1} \cdot z_2^{\theta_2} \ r = r_1^{\theta_1} \cdot r_2^{\theta_2} \ v = h_u{}^{\rho} \ u = u_1^{\theta_1} \cdot u_2^{\theta_2} \cdot H_{\mathbb{G}}(\tau)^{-\rho}$$

where $\tau = \text{CMhash}(\text{hk}, (C_0, C_1, C_2, C_3, z, r, v, s_{hash}) \in \{0,1\}^L$.
3. Output the ciphertext $$C = (C_0, C_1, C_2, C_3, z, r, u, v, s_{hash}) \in \mathbb{G}^8 \times \mathcal{R}_{hash}$$

Ciphertext-Verify (PK,C): parce C as per the previous equation. Return 1 if and only if $(z, r, u, v) \in \mathbb{G}^4$ is a valid linearly homomorphic signature on the vector $(C_1, C_2, C_3)$ and satisfies $$1_{\mathbb{G}_T} = e(z, \hat{g}_z) \cdot e(r, \hat{g}_r) \cdot \Pi_{i=1}^3 e(C_i, \hat{g}_i) \text{ and}$$

$$1_{\mathbb{G}_T} = e(z, \hat{h}_z) \cdot e(u, \hat{h}_u) \cdot e(v, H_{\hat{\mathbb{G}}}(\tau)) \cdot \Pi_{i=1}^3 e(C_i, \hat{h}_i).$$

where $\tau = \text{CMhash}(\text{hk}, (C_0, C_1, C_2, C_3, z, r, v), s_{hash}) \in \{0,1\}^L$.
Share-Decrypt (PK,i,SK$_i$,C): on inputs SK$_i = (P_1(i), P_2(i), P(i)) \in \mathbb{Z}_p^3$ and C, return $(i, \perp)$ if Ciphertext-Verify (PK,C)=0. Otherwise, compute $\hat{\mu}_i = (v_i, \vec{C}_{P_1}, \vec{C}_{P_2}, \vec{C}_P, \pi_{v_i})$ which consists of a partial decryption $v_i = C_1^{P_1(i)} \cdot C_2^{P_2(i)} \cdot C_3^{P(i)}$, commitments $\vec{C}_{P_1}, \vec{C}_{P_2}, \vec{C}_P$ to exponents $P_1(i), P_2(i), P(i) \in \mathbb{Z}_p$ and a proof $\pi_{v_i}$ that these satisfy $$v_i = C_1^{P_1(i)} \cdot C_2^{P_2(i)} \cdot C_3^{P(i)}, \ Y_{i,1} = f^{P_1(i)} g^{P(i)}, \ Y_{i,2} = h^{P_2(i)} g^{P(i)}.$$

The commitments $\vec{C}_{P_1}, \vec{C}_{P_2}, \vec{C}_P$ and the proof $\pi_{v_i}$ that are generated using the Groth-Sahai common reference string ($\vec{f}_1, \vec{f}_2, \vec{f}_3$).
Share-Verify (PK, VK, C, $\{(i, \hat{\mu}_i)\}_{i \in S}$): parse C as $(C_0, C_1, C_2, C_3, z, r, u, v, s_{hash})$ and VK$_i$ as $(Y_{i,1}, Y_{i,2}) \in \mathbb{G}^2$. If $\hat{\mu}_i = \perp$ or if $\hat{\mu}_i$ cannot be parsed properly as $(v_i, \vec{C}_{P_1}, \vec{C}_{P_2}, \vec{C}_P, \pi_{\mu_i})$, 0 is returned. Otherwise, if $\pi_{v_i}$ is a valid proof, 1 is returned. 0 is returned in any other situation.
Combine (PK, VK, C, $\{(i, \hat{\mu}_i)\}_{i \in S}$): for each $i \in S$, $\hat{\mu}_i$ is parsed as $(v_i, \vec{C}_{P_1}, \vec{C}_{P_2}, \vec{C}_P, \pi_{\mu_i})$ and $\perp$ is returned if Share-Verify (PK, VK, C, (i, $\hat{\mu}_i$))=0. Otherwise, the following is computed $$v = \prod_{i \in S} v_i^{\Delta_{i,S}(0)} = C_1^{x_1} \cdot C_2^{x_2} \cdot C_3^{y} = X_1^{\theta_1} \cdot X_2^{\theta_2}$$

which allows recovering $M = C_0/v$.

If the scheme is instantiated using the standard discrete-logarithm-based chameleon hash function described by Krawczyk-Rabin, $s_{hash}$ consists of a single element of $\mathbb{Z}_p$. The whole ciphertext C thus lives in $\mathbb{G}^8 \times \mathbb{Z}_p$. Concretely, if each element has a representation of 256 bits, as recommended on Barreto-Naehrig curves [see P. Barreto, M. Naehrig. Pairing-Friendly Elliptic Curves of Prime Order. In *SAC'05*, Lecture Notes in Computer Science 3897, pp. 319-331, Springer, 2005.] at the 128-bit security level, the ciphertext overhead (i.e., the difference between the size of the ciphertext and that of the plaintext) amounts to 2048 bits. In comparison, the most efficient scheme provided by Libert-Yung, which relies on the stronger Symmetric eXternal Diffie Hellman (SXDH) assumption, has a ciphertext overhead of 3328 bits. The scheme of the first preferred embodiment can thus compress ciphertexts by 36% while relying on weaker hardness assumptions. Moreover, the scheme works in all pairing configurations: unlike the SXDH-based construction of Libert-Yung, it can be safely instantiated in asymmetric pairing configurations (G, d, ($\mathbb{G}$, $\hat{\mathbb{G}}$, $\mathbb{G}_T$) endowed with an efficiently computable isomorphism: $\psi: \hat{\mathbb{G}} \to \mathbb{G}$.

Second Preferred Embodiment

The first preferred embodiment can be further optimized by assuming that the relies on the Decision Diffie-Hellman (DDH) assumption holds in the group $\hat{\mathbb{G}}$. In $\hat{\mathbb{G}}$, the XDLIN$_2$ assumption is still relied on, so there is no need to assume that no isomorphism of the form $\psi: \hat{\mathbb{G}} \to \mathbb{G}$ is efficiently computable: the construction works with or without it.
In the second preferred embodiment, the ciphertext overhead reduces to 6 elements of $\mathbb{G}$ and one scalar.
Keygen ($\lambda$, t, n):
1. Choose asymmetric bilinear groups ($\mathbb{G}$, $\hat{\mathbb{G}}$, $\mathbb{G}_T$) of prime order $p > 2^\lambda$, generators $$f, h \xleftarrow{R} \mathbb{G}, \hat{g} \xleftarrow{R} \hat{\mathbb{G}}, x, y \xleftarrow{R} \mathbb{Z}_p$$

and set $X = f^x h^y \in \mathbb{G}$. Then, define the vector $\vec{f} = (f, h) \in \mathbb{G}^2$.
2. Choose $$\hat{f}_1, \hat{f}_2 \xleftarrow{R} \hat{\mathbb{G}}$$

and define vectors $$\vec{f}_1 = (\vec{f}_1, 1, \hat{g}), \ \vec{f}_2 = (1, \hat{f}_2, \hat{g}), \ \vec{f}_3 = \vec{f}_1^{\varphi_1} \cdot \vec{f}_2^{\varphi_2} \cdot (1, 1, \hat{g})$$

where $$\phi_1, \phi_2 \xleftarrow{R} \mathbb{Z}_p,$$

which is used as a Groth-Sahai Common reference string (CRS) to prove the validity of decryption shares.
3. Choose random polynomials $P_1[Z], P_2[Z] \in \mathbb{Z}_p[Z]$ of degree $t-1$ such that $P_1(0)=x$, $P_2(0)=y$. For each $i \in \{1, \ldots, n\}$, compute $$Y_{i,1} = f^{P_1(i)} h^{P_2(i)} \in \mathbb{G}.$$

4. Choose a chameleon hash function CMH=(CMKg, CMhash, CMswitch) where the hashing algorithm CMhash ranges over $\{0,1\}^L$, with L∈poly(λ). Then, generate a pair (hk, tk) $\xleftarrow{\$}$ $\mathcal{G}$ (λ) and erase the trapdoor tk.

5. Generate a key pair for the linearly homomorphic signature with n=2. Let $$(g_z, g_r, h_z, h_u, \hat{g}_z, \hat{g}_r, \hat{h}_z, \hat{h}_u, \{g_i, h_i\}_{i=1}^3, \{\hat{g}_i, \hat{h}_i\}_{i=1}^3, w, \hat{w})$$

be the public key, where $w \in \mathbb{G}^{L+1}$ and $\hat{w} \in \mathbb{G}^{L+1}$, and let $\{\chi_i, \gamma_i, \delta_i\}_{i=1}^2$ be the corresponding private key. The private key component $h_z^{\alpha_r}$ will not be used and can be discarded.

6. Generate a one-time linearly homomorphic structure-preserving signature $(z_1, r_1, u_1)$ on the vector $\vec{f} = (f, h) \in \mathbb{G}^2$. This signature is obtained as $$(z_1, r_1, u_1) = (f^{-\chi_1} h^{-\chi_3}, f^{-\gamma_1} h^{-\gamma_3}, f^{-\delta_1} h^{-\delta_3}).$$

7. Define the vector of decryption key shares as SK=$(SK_1, \ldots, SK_n)$, where $SK_i = (P_1(i), P_2(i)) \in \mathbb{Z}_p^2$ for each $i \in \{1, \ldots, n\}$. The corresponding vector VK=$(VK_1, \ldots, VK_n)$ of verification keys is obtained by defining $VK_i = Y_{i,1}$ for $i=1$ to n. The public key PK is defined as $$(g, \hat{g}, \vec{f}, \vec{h}, \vec{f}_1, \vec{f}_2, \vec{f}_3, X, g_z, g_r, h_z, h_u, \hat{g}_z, \hat{g}_r, \hat{h}_z, \hat{h}_u, \{g_i, h_i\}_{i=1}^3, \{\hat{g}_i, \hat{h}_i\}_{i=1}^3, w, \hat{w}, \{(z_j, r_j, u_j)\}_{j=1}^3, hk)$$

Encrypt (M, PK): to encrypt a message $M \in \mathbb{G}$:
1. Choose $$\theta_1 \xleftarrow{R} \mathbb{Z}_p$$

and compute $$C_0 = M \cdot X^{\theta_1}, \quad C_1 = f^{\theta_1}, \quad C_2 = h^{\theta_1}.$$

2. Construct a linearly homomorphic signature (z, r, u, v) on the vector $(C_1, C_2) \in \mathbb{G}^2$ with respect to a tag τ that will authenticate the whole ciphertext. Namely, choose $$\rho \xleftarrow{R} \mathbb{Z}_p$$

as well as random coins $$s_{hash} \xleftarrow{R} \mathcal{R}_{hash}$$

for CMH and compute $$z = z_1^{\theta_1} \; r = r_1^{\theta_1} \; v = h_u^\rho \; u = u_1^{\theta_1} \cdot H_\mathbb{G}(\tau)^{-\rho}$$

where $\tau = \text{CMhash}(hk, (C_0, C_1, C_2, z, r, v), s_{hash}) \in \{0,1\}^L$.

3. Output the ciphertext $$C = (C_0, C_1, C_2, z, r, u, v, s_{hash}) \in \mathbb{G}^7 \times \mathcal{R}_{hash}$$

Ciphertext-Verify (PK,C): parse C as per the previous equation. Return 1 if and only if $(z, r, u, v) \in \mathbb{G}^4$ is a valid linearly homomorphic signature on the vector $(C_1, C_2)$ and satisfies $$1_{\mathbb{G}_T} = e(z, \hat{g}_z) \cdot e(r, \hat{g}_r) \cdot \Pi_{i=1}^2 e(C_i, \hat{g}_i) \text{ and}$$

$$1_{\mathbb{G}_T} = e(z, \hat{h}_z) \cdot e(u, \hat{h}_u) \cdot e(v, H_\mathbb{G}(\tau)) \cdot \Pi_{i=1}^2 e(C_i, \hat{h}_i).$$

where $\tau = \text{CMhash}(hk, (C_0, C_1, C_2, z, r, v), s_{hash}) \in \{0,1\}^L$.
Share-Decrypt (PK,i,$SK_i$,C): on inputs $SK_i = (P_1(i), P_2(i)) \in \mathbb{Z}_p^2$ and C, return (i, ⊥) if Ciphertext-Verify (PK,C)=0. Otherwise, compute $\hat{\mu}_i = (v_i, \vec{C}_{P_1}, \vec{C}_{P_2}, \pi_{\mu_i})$ which consists of a partial decryption $v_i = C_1^{P_1(i)} \cdot C_2^{P_2(i)}$ commitments $\vec{C}_{P_1}, \vec{C}_{P_2}$ to exponents $P_1(i), P_2(i) \in \mathbb{Z}_p$ and a proof $\pi_{\mu_i}$ that these satisfy $$v_i = C_1^{P_1(i)} \cdot C_2^{P_2(i)}, \quad Y_{i,1} = f^{P_1(i)} h^{P_2(i)}.$$

The commitments $\vec{C}_{P_1}, \vec{C}_{P_2}$ and the proof $\pi_{\mu_i}$ that are generated using the Groth-Sahai common reference string ($\vec{f}_1, \vec{f}_2, \vec{f}_3$).

Share-Verify (PK, VK, C, (i, $\hat{\mu}_i$)): parse C as $(C_0, C_1, C_2, z, r, u, v, s_{hash})$ and $VK_i$ as $Y_{i,1} \in \mathbb{G}$. If $\hat{\mu}_i = \bot$ or if $\hat{\mu}_i$ cannot be parsed properly as $(v_i, \vec{C}_{P_1}, \hat{C}_{P_2}, \pi_{\mu_i})$, 0 is returned. Otherwise, if $\pi_{\mu_i}$ is a valid proof, 1 is returned. 0 is returned in any other situation.

Combine (PK, VK, C, $\{(i, \hat{\mu}_i)\}_{i \in S}$): for each $i \in S$, $\hat{\mu}_i$ is parsed as $(v_i, \vec{C}_{P_1}, \vec{C}_{P_2}, \pi_{\mu_i})$ and ⊥ is returned if Share-Verify (PK, VK, C, (i, $\hat{\mu}_i$))=0. Otherwise, the following is computed $$v = \prod_{i \in S} v_i^{\Delta_{i,s}(0)} = C_1^x \cdot C_2^y = X^{\theta_1}$$

which allows recovering M by calculating $M = C_0/v$.

At the 128-bit security level, the ciphertext overhead is now reduced to 1792 bits, which improves upon the 3328-bit overhead of Libert-Yung (in their most efficient SXDH-based solution) by about 46%.

If it is assumed that a multi-exponentiation with two base elements has roughly the same cost as a single-base exponentiation, the computational workload for the sender is reduced to 8 exponentiations in $\mathbb{G}$ (including the chameleon hash evaluation cost). In order to check the validity of a ciphertext, the verifier only has to evaluate a product of 6 pairings when the two equations in Ciphertext-Verify are simultaneously processed using a randomized batch verification mechanism. Under the SXDH assumption, the Libert-Yung's framework requires 7 exponentiations in $\mathbb{G}$ and 2 exponentiations in $\mathbb{G}$ (where they tend to be slower than in $\mathbb{G}$) if their scheme is instantiated using Groth's one-time signature [see J. Groth. Simulation-sound NIZK proofs for a practical language and constant size group signatures. In *Asiacrypt* 2006, *Lecture Notes in Computer Science* 4284, pp. 444-459, 2006.]. Using batch verification techniques [see O. Blazy, G. Fuchsbauer, M. Izabachène, A. Jambert, H. Sibert, D. Vergnaud. Batch Groth-Sahai. In *Applied Cryptography and Network Security* (ACNS'10), *Lecture Notes in Computer Science* 6123, pp. 218-235, 2010.], both schemes have the same cost when it comes to check the validity of a ciphertext.

From a computational standpoint, the above solution is thus slightly faster than Libert-Yung with the advantage of substantially shorter ciphertexts. Moreover, the scheme of the second preferred embodiment still relies on weaker hardness assumptions than Libert-Yung since it is not required that DDH be hard in $\mathbb{G}$: the scheme of the second preferred embodiment remains secure in Type II pairing configurations, in the presence of an efficiently computable isomorphism: $\psi: \mathbb{G} \to \mathbb{G}$.

It will also be appreciated that, like the constructions of Libert-Yung, the constructions of the present embodiments remain compatible with existing adaptively secure protocols (see e.g., R. Canetti, R. Gennaro, S. Jarecki, H. Krawczyk, T. Rabin. Adaptive Security for Threshold Cryptosystems. In *Crypto '99*, *Lecture Notes in Computer Science* 1666, pp. 98-115, Springer, 1999.]) allowing a set of parties to jointly generate a public key in order to avoid the need for a trusted dealer in the key generation phase.

Third Preferred Embodiment

As already mentioned, the third preferred embodiment, which is a variant of the first preferred embodiment, relies on the second signature scheme described in the Annex.

Keygen ($\lambda$, t, n):

1. Choose bilinear groups ($\mathbb{G}$, $\hat{\mathbb{G}}$, $\mathbb{G}_T$) of prime order $p > 2^\lambda$, generators $$g, f, h \xleftarrow{R} \mathbb{G}, \hat{g} \xleftarrow{R} \hat{\mathbb{G}}, x_1, x_2, y \xleftarrow{R} \mathbb{Z}_p$$

and set $X_1 = f^{x_1} g^y \in \mathbb{G}$, $X_2 = h^{x_2} g^y \in \mathbb{G}$. Then, define the vectors $\vec{f} = (f, 1, g) \in \mathbb{G}^3$ and $\vec{h} = (1, h, g) \in \mathbb{G}^3$.

2. Choose $$\hat{f}_1, \hat{f}_2 \xleftarrow{R} \hat{\mathbb{G}}$$

and define vectors $$\vec{f}_1 = (\hat{f}_1, 1, \hat{g}), \vec{f}_2 = (1, \hat{f}_2, \hat{g}), \vec{f}_3 = \vec{f}_1^{\varphi_1} \cdot \vec{f}_2^{\varphi_2} \cdot (1, 1, \hat{g})$$

where $$\phi_1, \phi_2 \xleftarrow{R} \mathbb{Z}_p,$$

which is used as Groth-Sahai Common reference string (CRS) to prove the validity of decryption shares.

3. Choose random polynomials $P_1[Z], P_2[Z], P[Z] \in \mathbb{Z}_p[Z]$ of degree $t-1$ such that $P_1(0) = x_1$, $P_2(0) = x_2$ and $P(0) = y$. For each $i \in \{1, n\}$, compute $$Y_{i,1} = f^{P_1(i)} g^{P(i)}, Y_{i,2} = h^{P_2(i)} g^{P(i)}.$$

4. Choose a chameleon hash function CMH=(CMKg, CMhash, CMswitch) where the hashing algorithm CMhash ranges over $\{0,1\}^L$, with $L \in \text{poly}(\lambda)$. Then, generate a pair $$(hk, tk) \xleftarrow{\$} \mathcal{G}(\lambda)$$

made of a hashing key hk and its corresponding trapdoor tk. As the latter is not used in the scheme, it can be erased.

5. Generate a key pair for the linearly homomorphic signature of the second signature scheme in the Annexe with n=3. Let $$(g_z, g_r, h_z, h_u, \hat{g}_z, \hat{g}_r, \hat{h}_z, \hat{h}_u, \{g_i, h_i\}_{i=1}^3, \{\hat{g}_i, \hat{h}_i\}_{i=1}^3, w, \hat{w})$$

be the public key, where $w \in \mathbb{G}^{L+1}$ and $\hat{w} \in \hat{\mathbb{G}}^{L+1}$, and let $\{\chi_i, \gamma_i, \delta_i\}_{i=1}^3$ be the corresponding private key. The private key component $h_z^{\alpha_r}$ is not used and can be discarded.

6. Generate one-time linearly homomorphic signatures $\{(z_j, r_j, u_j)\}_{j=1,2}$ on the vectors $\vec{f} = (f, 1, g) \in \mathbb{G}^3$ and $\vec{h} = (1, h, g) \in \mathbb{G}^3$. These are obtained as $$(z_1, r_1, u_1) = (f^{-\chi_1} g^{-\chi_3}, f^{-\gamma_1} g^{-\gamma_3}, f^{-\delta_1} g^{-\delta_3}) \text{ and}$$

$$(z_2, r_2, u_2) = (h^{-\chi_2} g^{-\chi_3}, h^{-\gamma_2} g^{-\gamma_3}, h^{-\delta_2} g^{-\delta_3}).$$

7. Define the vector of decryption key shares as $SK = (SK_1, \ldots, SK_n)$, where $SK_i = (P_1(i), P_2(i), P(i)) \in \mathbb{Z}_p^3$ for each $i \in \{1, \ldots, n\}$. The corresponding vector $VK = (VK_1, \ldots, VK_n)$ of verification keys is defined so that, for each $i \in \{1, \ldots, n\}$, $VK_i = (Y_{i,1}, Y_{i,2}) \in \mathbb{G}^2$. The public key PK is defined as $$(g, \hat{g}, \vec{f}, \vec{h}, \vec{f}_1, \vec{f}_2,$$
$$\vec{f}_3, X_1, X_2, g_z, g_r, h_z, h_u, \hat{g}_z, \hat{g}_r, \hat{h}_z, \hat{h}_u, \{g_i, h_i\}_{i=1}^3, \{\hat{g}_i, \hat{h}_i\}_{i=1}^3, w, \hat{w},$$
$$\{(z_j, r_j, u_j)\}_{j=1}^3, hk)$$

Encrypt (M, PK): to encrypt a message $M \in \mathbb{G}$:

1. Choose $$\theta_1, \theta_2 \xleftarrow{R} \mathbb{Z}_p$$

and compute $$C_0 = M \cdot X_1^{\theta_1} \cdot X_2^{\theta_2}, C_1 = f^{\theta_1}, C_2 = h^{\theta_2}, C_3 = g^{\theta_1 + \theta_2}.$$

2. Derive a linearly homomorphic signature (z, r, u, v) on the vector $(C_1, C_2, C_3) \in \mathbb{G}^3$ with respect to a tag $\tau$ that will authenticate the whole ciphertext. Namely, choose $$\rho, \vartheta \xleftarrow{R} \mathbb{Z}_p$$

as well as random coins $$s_{hash} \xleftarrow{R} \mathcal{R}_{hash}$$

for CMH and compute $$z = z_1^{\theta_1} \cdot z_2^{\theta_2} \, v = h_u^\rho \, w = g_r^\vartheta$$

$$r = r_1^{\theta_1} \cdot r_2^{\theta_2} \cdot H_{\mathbb{G}}(\tau)^{-\vartheta} \, u = u_1^{\theta_1} \cdot u_2^{\theta_2} \cdot H_{\mathbb{G}}(\tau)^{-\rho}$$

where $\tau = \text{CMhash}(hk, (C_0, C_1, C_2, C_3, z, v, w), s_{hash}) \in \{0, 1\}^L$.

3. Output the ciphertext $$C = (C_0, C_1, C_2, C_3, z, r, u, v, w, s_{hash}) \in \mathbb{G}^9 \times \mathcal{R}_{hash}$$

Ciphertext-Verify(PK,C): parse C as per the previous equation. Return 1 if and only if $(z, r, u, v, w) \in \mathbb{G}^5$ is a valid linearly homomorphic signature on the vector $(C_1, C_2, C_3)$ and satisfies $$1_{\mathbb{G}_T} = e(z, \hat{g}_z) \cdot e(r, \hat{g}_r) \cdot e(w, H_{\hat{\mathbb{G}}}(\tau)) \cdot \Pi_{i=1}^3 e(C_i, \hat{g}_i) \text{ and}$$

$$1_{\mathbb{G}_T} = e(z, \hat{h}_z) \cdot e(u, \hat{h}_u) \cdot e(v, H_{\hat{\mathbb{G}}}(\tau)) \cdot \Pi_{i=1}^3 e(C_i, \hat{h}_i).$$

where $\tau = \text{CMhash}(hk, (C_0, C_1, C_2, C_3, s_{hash}) \in \{0,1\}^L$.

Share-Decrypt (PK, i, $SK_i$, C): on inputs $SK_i = (P_1(i), P_2(i), P(i)) \in \mathbb{Z}_p^3$ and C, return $(i, \perp)$ if Ciphertext-Verify (PK,C)=0. Otherwise, compute $\hat{\mu}_i = (v_i, \vec{C}_{P_1}, \vec{C}_{P_2}, \vec{C}_P, \pi_{v_i})$ which consists of a partial decryption $v_i = C_1^{P_1(i)} \cdot C_2^{P_2(i)} \cdot C_3^{P(i)}$, commitments $\vec{C}_{P_1}, \vec{C}_{P_2}, \vec{C}_P$ to exponents $P_1(i), P_2(i), P(i) \in \mathbb{Z}_p$ and a proof $\pi_{v_i}$ that these satisfy $$v_i = C_1^{P_1(i)} \cdot C_2^{P_2(i)} \cdot C_3^{P(i)}, Y_{i,1} = f^{P_1(i)} g^{P(i)}, Y_{i,2} = h^{P_2(i)} g^{P(i)}.$$

The commitments $\vec{C}_{P_1}, \vec{C}_{P_2}, \vec{C}_P$ and the proof $\pi_{v_i}$ that are generated using the Groth-Sahai common reference string ($\vec{f}_1, \vec{f}_2, \vec{f}_3$).

Share-Verify (PK, VK, C, $\{(i, \hat{\mu}_i)\}_{i \in S}$): parse C as $(C_0, C_1, C_2, C_3, z, r, u, w, s_{hash})$ and $VK_i$ as $(Y_{i,1}, Y_{i,2}) \in \mathbb{G}^2$. If $\hat{\mu}_i = \perp$ or if $\hat{\mu}_i$ cannot be parsed properly as $(v_i, \vec{C}_{P_1}, \vec{C}_{P_2}, \vec{C}_P, \pi_{\mu_i})$, 0 is returned. Otherwise, if $\pi_{v_i}$ is a valid proof, 1 is returned. 0 is returned in any other situation.

Combine (PK, VK, C, $\{(i, \hat{\mu}_i)\}_{i \in S}$): for each $i \in S$, $\hat{\mu}_i$ is parsed as $(v_i, \hat{C}_{P_1}, \hat{C}_{P_2}, \hat{C}_P, \pi_{\mu_i})$ and $\perp$ is returned if Share-Verify (PK, VK, C, $(i, \hat{\mu}_i)$)=0. Otherwise, the following is computed $$v = \prod_{i \in S} v_i^{\Delta_{i,s}(0)} = C_1^{x_1} \cdot C_2^{x_2} \cdot C_3^{y} = X_1^{\theta_1} \cdot X_2^{\theta_2}$$

which allows recovering $M = C_0/v$.

FIG. 1 illustrates an exemplary system in which the invention may be implemented. The system comprises an entity device ("server") 110 that is one of the n entities that share a private key (the other entity devices are not illustrated) and a sender device 120. The devices 110, 120 can be any kind of suitable computer or device capable of performing calculations, such as a standard Personal Computer (PC) or workstation. The devices 110, 120 each preferably comprise at least one (hardware) processor 111, 121, RAM memory 112, 122, a user interface 113, 123 for interacting with a user, and a second interface 114, 124 for interaction with other devices over connection 130.

The sender device 120 is configured to encrypt a message as described herein, and the entity device 110 is configure to generate keys, verify ciphertexts, share partial decryptions, verify partial decryptions and recover the plaintext message as described herein.

The devices 110, 120 each also preferably comprise an interface for reading a software program from a non-transitory digital data support 140, 150 that stores instructions that, when executed by a processor, perform the corresponding functions. The skilled person will appreciate that the illustrated devices are very simplified for reasons of clarity and that real devices in addition would comprise features such as persistent storage.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

ANNEXE

A First Linearly Homomorphic Structure-Preserving Signature Scheme

Keygen ($\lambda$, n): given a security parameter $\lambda$ and the dimension $n \in \mathbb{N}$ of the subspace to be signed:

1. Choose a bilinear group ($\mathbb{Z}$, $\mathbb{G}$, $\mathbb{Z}_T$) of prime order $p > 2^\lambda$.
2. Choose $$h_u \xleftarrow{R} \mathbb{G},$$
$$\hat{h}_u \xleftarrow{R} \hat{\mathbb{G}}$$

and $\alpha_z$, $\alpha_r$, $$\beta_z \xleftarrow{R} \mathbb{Z}_p,$$

and define $$g_z = h_u^{\alpha_z}, \; g_r = h_u^{\alpha_r}, \; h_z = h_u^{\beta_z},$$
$$\hat{g}_z = \hat{h}_u^{\alpha_z}, \; \hat{g}_r = \hat{h}_u^{\alpha_r}, \; \hat{h}_z = \hat{h}_u^{\beta_z}.$$

3. For i=1 to n, pick $\chi_i$, $\gamma_i$, $$\delta_i \xleftarrow{R} \mathbb{Z}_p$$

and compute $g_i = g_z^{\chi_i} g_r^{\gamma_i}$, $h_i = h_z^{\chi_i} h_u^{\delta_i}$, $\hat{g}_i = \hat{g}_z^{\chi_i} \hat{g}_r^{\gamma_i}$, $\hat{h}_i = \hat{h}_z^{\chi_i} \hat{h}_u^{\delta_i}$.

4. Choose a random vector $$(\alpha_{w,0}, \ldots, \alpha_{w,L}) \xleftarrow{R} \mathbb{Z}_p^{L+1}$$

and, for i=1 to L, compute $\hat{w}_i = \hat{h}_u^{\alpha_{w,i}}$ and $w_i = h_u^{\alpha_{w,i}}$. Define the vectors $\hat{w} = (\hat{w}_0, \hat{w}_1, \ldots, \hat{w}_L) \in \hat{\mathbb{G}}^{L+1}$ and $w = (w_0, w_1, \ldots, w_L) \in \mathbb{Z}^{L+1}$ that define hash functions $H_{\hat{\mathbb{G}}} : \{0,1\}^L \to \hat{\mathbb{G}}$ and $H\mathbb{Z}: \{0,1\}^L \to \mathbb{Z}$ that map L-bit strings $\tau \in \{0,1\}^L$ to $H_{\hat{\mathbb{G}}}(\tau) = \hat{w}_0 \cdot \prod_{k=1}^L \hat{w}_k^{\tau[k]}$ and $H\mathbb{Z}(\tau) = w_0 \cdot \prod_{k=1}^L w_k^{\tau[k]}$, respectively.

The public key pk comprises $$(g_z, g_r, h_z, h_u, \hat{g}_z, \hat{g}_r, \hat{h}_z, \hat{h}_u, \{g_i, h_i\}_{i=1}^n, \{\hat{g}_i, \hat{h}_i\}_{i=1}^n, w, \hat{w})$$

while the private key is sk=($h_z^{\alpha_r}$, $\{\chi_i, \gamma_i, \delta_i\}_{i=1}^n$).

Sign (sk, $\tau$, ($M_1, \ldots, M_n$)): to sign a vector ($M_1, \ldots, M_n$) $\in \mathbb{Z}^n$ with regard to the file identifier $\tau$ using sk=($h_z^{\alpha_r}$, $\{\chi_i, \gamma_i, \delta_i\}_{i=1}^n$), choose $$\theta, \rho \xleftarrow{R} \mathbb{Z}_p$$

and compute $$z = g_r^\theta \cdot \prod_{i=1}^n M_i^{-\chi_i}, \; r = g_z^{-\theta} \cdot \prod_{i=1}^n M_i^{-\gamma_i},$$

$$u = (h_z^{\alpha_r})^{-\theta} \cdot \prod_{i=1}^n M_i^{-\delta_i} \cdot H_{\mathbb{G}}(\tau)^{-\rho}, \; v = h_u^\rho$$

The signature that is output comprises $\sigma = (z, r, u, v) \in \mathbb{Z}^4$.

SignDerive (pk, $\tau$, $\{(\omega_i, \sigma^{(i)})\}_{i=1}^l$): given pk, a file identifier $\tau$ and l tuples ($\omega_i$, $\sigma^{(i)}$), parse each signature $\sigma^{(i)}$ as $\sigma^{(i)} = (z_i, r_i, u_i, v_i) \in \mathbb{G}^4$ for i=1 to l. Then choose $$\rho' \xleftarrow{R} \mathbb{Z}_p$$

and compute $$z = \prod_{i=1}^l z_i^{\omega_i}$$

$$r = \prod_{i=1}^l r_i^{\omega_i}$$

$$u = \prod_{i=1}^l u_i^{\omega_i} \cdot H_{\mathbb{G}}(\tau)^{-\rho'}$$

$$v = \prod_{i=1}^l v_i^{\omega_i} \cdot h_u^{\rho'}$$

and return $\sigma = (z, r, u, v)$.

Verify (pk, σ, τ, (M$_1$, ..., M$_n$)): given a signature σ=(z, r, u, v)∈ $\mathbb{G}^4$, a file identifier τ and a vector (M$_1$, ..., M$_n$), return 1 if and only if (M$_1$, ..., M$_n$)≠($\mathbb{G}$, ..., $\mathbb{G}$) and (z, r, u, v) satisfy the equalities $$1_{\mathbb{G}_T} = e(z, \hat{g}_z) \cdot e(r, \hat{g}_r) \cdot \prod_{i=1}^{n} e(M_i, \hat{g}_i),$$

$$1_{\mathbb{G}_T} = e(z, \hat{h}_z) \cdot e(u, \hat{h}_u) \cdot e(v, H_{\hat{\mathbb{G}}}(\tau)) \cdot \prod_{i=1}^{n} e(M_i, \hat{h}_i).$$

This scheme has a one-time variant, where a given public key allows signing only one linear subspace. This variant is obtained by setting θ=ρ=0 in the signing algorithm. Namely, a signature on a vector (M$_1$, ..., M$_n$)∈ $\mathbb{G}^n$ comprises a triple (z, r, u)=($\prod_{i=1}^{n} M_i^{-\chi_i}$, $\prod_{i=1}^{n} M_i^{-\gamma_i}$, $\prod_{i=1}^{n} M_i^{-\delta_i}$).

A Second Linearly Homomorphic Structure-Preserving Signature Scheme

Keygen (λ, n): is the same as in the first scheme.

Sign (sk, τ, (M$_1$, ..., M$_n$)): to sign a vector (M$_1$, ..., M$_n$)∈ $\mathbb{G}^n$ with regard to the file identifier τ using sk=(h$_z^{\alpha_r}$, {χ$_i$, γ$_i$, δ$_i$}$_{i=1}^n$), choose $$\theta, \rho \xleftarrow{R} \mathbb{Z}_p$$

and compute $$z = g_r^\theta \cdot \prod_{i=1}^{n} M_i^{-\chi_i}, r = g_z^{-\theta} \cdot \prod_{i=1}^{n} M_i^{-\gamma_i} \cdot H_{\mathbb{G}}(\tau)^{-\theta},$$

$$u = (h_z^{\alpha_r})^{-\theta} \cdot \prod_{i=1}^{n} M_i^{-\delta_i} \cdot H_{\mathbb{G}}(\tau)^{-\rho}, v = h_u^\rho, w = g_r^\theta$$

The signature that is output comprises σ=(z, r, u, v, w)∈ $\mathbb{G}^5$.

SignDerive (pk, τ, {(ω$_i$, σ$^{(i)}$)}$_{i=1}^l$): given pk, a file identifier τ and l tuples (ω$_i$, σ$^{(i)}$), parse each signature σ$^{(i)}$ as σ$^{(i)}$=(z$_i$, r$_i$, u$_i$, v$_i$, w$_i$)∈ $\mathbb{G}^5$ for i=1 to l. Then choose $$\rho' \xleftarrow{R} \mathbb{Z}_p$$

and compute $$z = \prod_{i=1}^{l} z_i^{\omega_i}$$

$$r = \prod_{i=1}^{l} r_i^{\omega_i} \cdot H_{\hat{\mathbb{G}}}(\tau)^{-\theta}$$

$$u = \prod_{i=1}^{l} u_i^{\omega_i} \cdot H_{\mathbb{G}}(\tau)^{-\rho'}$$

$$v = \prod_{i=1}^{l} v_i^{\omega_i} \cdot h_u^{\rho'}$$

$$w = \prod_{i=1}^{l} \omega_i^{\omega_i} \cdot g_r^\theta$$

and return σ=(z, r, u, v, w).

Verify (pk, σ, τ, (M$_1$, ..., M$_n$)): given a signature σ=(z, r, u, v, w)∈ $\mathbb{G}^5$, a file identifier τ and a vector (M$_1$, ..., M$_n$), return 1 if and only if (M$_1$, ..., M$_n$)≠($\mathbb{G}$, ..., $\mathbb{G}$) and (z, r, u, v, w) satisfy the equalities $$1_{\mathbb{G}_T} = e(z, \hat{g}_z) \cdot e(r, \hat{g}_r) \cdot e(w, H_{\hat{\mathbb{G}}}(\tau)) \cdot \prod_{i=1}^{n} e(M_i, \hat{g}_i),$$

$$1_{\mathbb{G}_T} = e(z, \hat{h}_z) \cdot e(u, \hat{h}_u) \cdot e(v, H_{\hat{\mathbb{G}}}(\tau)) \cdot \prod_{i=1}^{n} e(M_i, \hat{h}_i).$$

The invention claimed is:

1. A device for encrypting a message using a public key, the device comprising:
   a processor configured to:
      obtain at least one encryption exponent;
      generate a first ciphertext component and a plurality of second ciphertext components, wherein the first ciphertext component is generated by multiplying the message with at least one element of the public key to the power of an encryption exponent and wherein each of the plurality of second ciphertext components is generated by taking at least one further element of the public key to the power of an encryption exponent;
      generate a linearly homomorphic signature on the plurality of second ciphertext components with respect to a tag obtained from the first ciphertext component and at least part of the plurality of second ciphertext components; and
      generate an overall ciphertext comprising the ciphertext components, and the linearly homomorphic signature; and
   an interface configured to output the overall ciphertext.

2. A device for partially decrypting a ciphertext using a partial private key comprising a share of an entire private key, the ciphertext comprising a first ciphertext component, a plurality of second ciphertext components and a linearly homomorphic signature for a vector comprising the plurality of second ciphertext components, the device comprising:
   a processor configured to:
      verify that the linearly homomorphic signature is a valid signature for a vector comprising the plurality of second ciphertext components;
      obtain a partial decryption of the ciphertext using the partial private key;
      generate commitments to exponents of the partial private key;
      generate a proof that the commitments satisfy at least one predefined equality showing the correctness of the partial decryption; and
      generate a result comprising the partial decryption, the commitments and the proof; and
   an interface configured to output the result.

3. The device of claim 2, the linearly homomorphic signature generated on the plurality of second ciphertext components with respect to a tag obtained from the first ciphertext component and at least part of the plurality of second ciphertext components.

4. A method for encrypting a message using a public key, the method comprising, at a device comprising a processor:
obtaining at least one encryption exponent;
generating a first ciphertext component and a plurality of second ciphertext components, wherein the first ciphertext component is generated by multiplying the message with at least one element of the public key to the power of an encryption exponent and wherein each of the plurality of second ciphertext components is generated by taking at least one further element of the public key to the power of an encryption exponent;
generating a linearly homomorphic signature on the plurality of second ciphertext components with respect to a tag obtained from the first ciphertext component and at least part of the plurality of second ciphertext components;
generating an overall ciphertext comprising the ciphertext components, and the linearly homomorphic signature; and
outputting the overall ciphertext.

5. A method for partially decrypting a ciphertext using a partial private key comprising a share of an entire private key, the ciphertext comprising a first ciphertext component, a plurality of second ciphertext components and a linearly homomorphic signature for a vector comprising the plurality of second ciphertext components, the method comprising, at a device comprising a processor:
verifying that the linearly homomorphic signature is a valid signature for a vector comprising the plurality of second ciphertext components;
obtaining a partial decryption of the ciphertext using the partial private key;
generating commitments to exponents of the partial private key;
generating a proof that the commitments satisfy at least one predefined equality showing the correctness of the partial decryption;
generating a result comprising the partial decryption, the commitments and the proof; and
outputting the result.

6. The method of claim 5, the linearly homomorphic signature generated on the plurality of second ciphertext components with respect to a tag obtained from the first ciphertext component and at least part of the plurality of second ciphertext components.

7. A non-transitory digital data support that stores instructions that, when executed by a processor, perform the method of claim 4.

8. A non-transitory digital data support that stores instructions that, when executed by a processor, perform the method of claim 5.

* * * * *